(No Model.)

J. McCAFFREY.
MECHANISM FOR LUBRICATING THE LOOSE PULLEY OF A SHAFT.

No. 316,159. Patented Apr. 21, 1885.

Witnesses.
S. N. Piper
Emil B. Pratt

Inventor.
John McCaffrey
by R. H. Eddy atty.

UNITED STATES PATENT OFFICE.

JOHN McCAFFREY, OF LAWRENCE, MASSACHUSETTS.

MECHANISM FOR LUBRICATING THE LOOSE PULLEY OF A SHAFT.

SPECIFICATION forming part of Letters Patent No. 316,159, dated April 21, 1885.

Application filed February 9, 1885. (No model.)

*To all whom it may concern:*

Be it known that I, JOHN MCCAFFREY, of Lawrence, in the county of Essex, of the Commonwealth of Massachusetts, have invented a new and useful Improvement in Mechanism for Lubricating the Loose Pulley of a Shaft; and I do hereby declare the same to be described in the following specification and represented in the accompanying drawings, of which—

Figure 1:
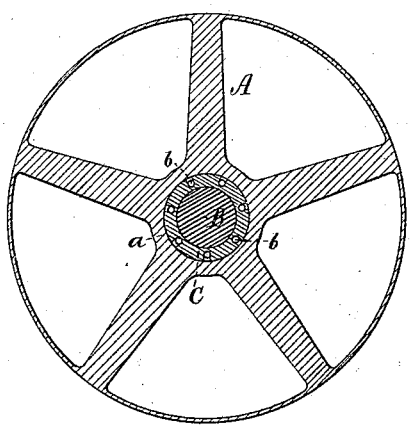
Figure 2:
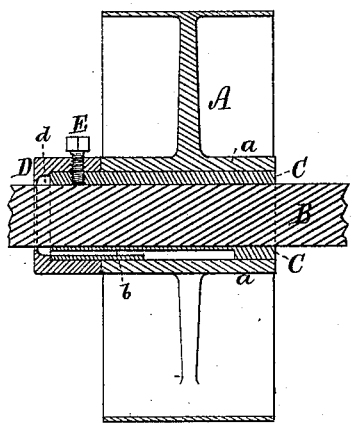
Figure 3:
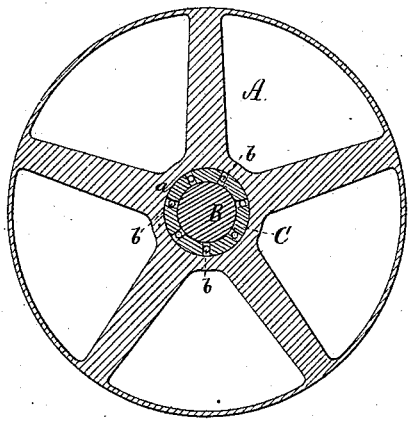
Figure 4:
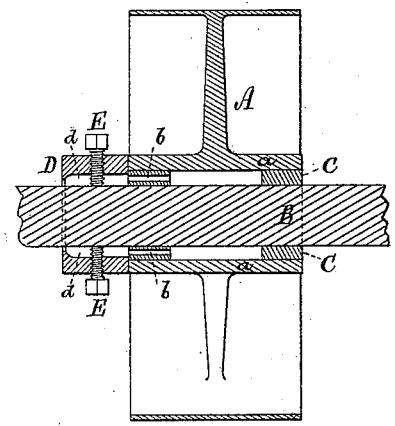

Figures 1 and 3 are transverse sections, and Figs. 2 and 4 are longitudinal sections, of a loose pulley and its shaft provided with my invention, the nature of which is defined in the claim hereinafter presented.

The pulley has within its hub $a$, and concentrically thereto and with the shaft, a sleeve or tube, C, into which from whose outer end, and at equal distances apart, are passages $b$, each of which opens through the outer circumference of the sleeve.

Applied to the said sleeve, and encompassing the shaft, is a tubular collar, D, which in Fig. 2 is represented as encircling and fitting upon the sleeve and extending from the hub $a$ $a$ short distance beyond the sleeve, the bore of the collar when projecting beyond the sleeve being gradually diminished in diameter, it being at its outer end somewhat larger in diameter than is the shaft. This collar, as shown in Fig. 2, is fastened to the sleeve, and the latter to the shaft by one or more set-screws, E, each of which goes through the collar transversely, and screws through the sleeve and against the shaft, from which it will be seen that the pulley when revolving turns upon the sleeve. In Fig. 4 the collar is shown as fastened directly to the shaft by the set-screws E, which screw into the collar and against the shaft, the sleeve not extending within the collar, in which case the sleeve will be free to revolve on the shaft and the pulley to revolve on the sleeve. Should the pulley become set upon the sleeve, the two can revolve together on the shaft, so, should the sleeve become set on the shaft, the pulley can revolve on the sleeve. In the combination shown in Fig. 2 the sleeve is not to revolve on the shaft.

When the pulley is in revolution, oil poured into the collar at its outer end will readily find its way into and through the passages of the sleeve, whereby the next contiguous bearing-surfaces of the hub and the sleeve will be lubricated.

The passages in the sleeve (shown in Fig. 4) open through the outer as well as through the inner periphery of the sleeve, so as to lead the oil both to the bearing-surfaces of the sleeve and hub and the sleeve and shaft.

The invention is to enable the pulley to be lubricated while it may be in revolution about the shaft, which can be accomplished by introducing the oil into the space $d$ within the sleeve by means of an oil-feeder of proper construction.

I do not claim a car-axle lubricator constructed as represented in the United States Patent No. 48,230, in which the cup for holding the oil is fastened to the hub of the wheel and revolves therewith, the tubular collar D of my device being fastened to the shaft, and, furthermore, the sleeve of my device has its oil-ducts to lead into it from its outer end, and the chamber in said collar opens at its outer end entirely around the shaft. Nor do I claim means of lubricating a wheel as represented in the United States Patent No. 124,618, as such means has no sleeve provided with oil-educts and adapted to operate like the sleeve of my lubricator.

I claim—

The combination of the loose pulley and its shaft, and the sleeve arranged within the hub of the pulley and upon the shaft concentrically, and provided with oil-ducts extending into it, the said sleeve, from its outer end, with the collar chambered and encompassing and opening at its outer end around the shaft, and fixed to it by set-screws, and abutting against the hub of the pulley, all being substantially as represented, and the sleeve being fastened to the hub or free to revolve thereon, as set forth.

JOHN McCAFFREY.

Witnesses:
JOHN J. KILBRIDE,
ALVIN E. MACK.